United States Patent
Kazmi et al.

(10) Patent No.: US 9,191,098 B2
(45) Date of Patent: Nov. 17, 2015

(54) CAPABILITY REPORTING FOR RELAY NODES IN WIRELESS NETWORKS

(75) Inventors: Muhammad Kazmi, Bromma (SE); Olav Queseth, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 934 days.

(21) Appl. No.: 13/147,219

(22) PCT Filed: Jun. 16, 2011

(86) PCT No.: PCT/SE2011/050749
§ 371 (c)(1),
(2), (4) Date: Aug. 1, 2011

(87) PCT Pub. No.: WO2012/096605
PCT Pub. Date: Jul. 19, 2012

(65) Prior Publication Data
US 2012/0184204 A1    Jul. 19, 2012

Related U.S. Application Data

(60) Provisional application No. 61/432,633, filed on Jan. 14, 2011.

(51) Int. Cl.
*H04B 7/155*    (2006.01)

(52) U.S. Cl.
CPC .................................. *H04B 7/15542* (2013.01)

(58) Field of Classification Search
CPC .......... H04B 7/2606; H04B 7/155542; H04W 88/04
USPC ............................................................ 455/7
See application file for complete search history.

(56) References Cited

U.S. PATENT DOCUMENTS

| 7,023,979 | B1 * | 4/2006 | Wu et al. ................... 379/265.11 |
| 7,995,994 | B2 * | 8/2011 | Khetawat et al. ............. 455/410 |

(Continued)

FOREIGN PATENT DOCUMENTS

| EP | 1777877 A2 | 4/2007 |
| EP | 2192699 A1 | 6/2010 |

OTHER PUBLICATIONS

Riback, M. et al. "Carrier Frequency Effects on Path Loss." IEEE 63rd Vehicular Technology Conference, Melbourne, Australia, May 7-10, 2006.

(Continued)

*Primary Examiner* — Hai V Nguyen
(74) *Attorney, Agent, or Firm* — Coats & Bennett, P.L.L.C.

(57) ABSTRACT

An out-of-band relay node (800) reports its composite operating band capability to a donor base station or to another network node. The reported information indicates frequency band support separately for each of the backhaul and access links, which may operate over different frequency bands. In some embodiments, a controlling network node (700) such as a donor base station, an O&M node, an OSS node, a SON node, or another relay node, requests the relay node to report its backhaul link and access link operating frequency band capabilities to the network node. A network node (700) that receives the frequency capability information may use the information to select appropriate frequency bands for access and backhaul link operation and to configure the relay node accordingly. The received frequency band capability information may also be used for one or more network management functions such as radio resources management, network planning, dimensioning, and coverage enhancement.

37 Claims, 5 Drawing Sheets

(56) References Cited

U.S. PATENT DOCUMENTS

| | | | | |
|---|---|---|---|---|
| 8,086,173 | B2* | 12/2011 | Zhang et al. | 455/7 |
| 8,165,073 | B2* | 4/2012 | Wang et al. | 370/329 |
| 8,175,024 | B2* | 5/2012 | Saifullah et al. | 370/315 |
| 8,526,964 | B2* | 9/2013 | Wei | 455/450 |
| 8,665,813 | B2* | 3/2014 | Golitschek Edler Von Elbwart | 370/329 |
| 8,675,604 | B2* | 3/2014 | Teyeb et al. | 370/331 |
| 8,681,684 | B2* | 3/2014 | Dohler et al. | 370/315 |
| 8,681,723 | B2* | 3/2014 | Seo et al. | 370/329 |
| 8,717,920 | B2* | 5/2014 | Larsson et al. | 370/252 |
| 8,737,253 | B2* | 5/2014 | Ko et al. | 370/252 |
| 8,767,638 | B2* | 7/2014 | Wu | 370/329 |
| 8,798,525 | B2* | 8/2014 | Kazmi et al. | 455/7 |
| 8,804,598 | B2* | 8/2014 | Ma et al. | 370/315 |
| 8,825,068 | B2* | 9/2014 | Wei | 455/450 |
| 8,848,597 | B2* | 9/2014 | Chung et al. | 370/315 |
| 8,848,662 | B2* | 9/2014 | Chun et al. | 370/331 |
| 8,855,056 | B2* | 10/2014 | Seo et al. | 370/328 |
| 8,891,477 | B2* | 11/2014 | Kim et al. | 370/329 |
| 8,995,331 | B2* | 3/2015 | Kazmi et al. | 370/315 |
| 9,066,242 | B2* | 6/2015 | Kazmi | 1/1 |
| 2006/0253736 | A1* | 11/2006 | Rudolf et al. | 714/12 |
| 2007/0070929 | A1 | 3/2007 | Kang et al. | |
| 2008/0031197 | A1* | 2/2008 | Wang et al. | 370/331 |
| 2008/0056173 | A1* | 3/2008 | Watanabe | 370/315 |
| 2008/0076386 | A1* | 3/2008 | Khetawat et al. | 455/410 |
| 2008/0117854 | A1* | 5/2008 | Saifullah et al. | 370/315 |
| 2008/0225823 | A1* | 9/2008 | Tenny | 370/345 |
| 2009/0196177 | A1* | 8/2009 | Teyeb et al. | 370/231 |
| 2009/0201874 | A1* | 8/2009 | Okuda | 370/329 |
| 2009/0221288 | A1* | 9/2009 | Zhang et al. | 455/434 |
| 2009/0238090 | A1* | 9/2009 | Sambhwani et al. | 370/252 |
| 2009/0245165 | A1* | 10/2009 | Li | 370/315 |
| 2010/0075694 | A1* | 3/2010 | Damnjanovic et al. | 455/452.2 |
| 2010/0167743 | A1* | 7/2010 | Palanki et al. | 455/436 |
| 2010/0177672 | A1* | 7/2010 | Dayal et al. | 370/311 |
| 2010/0240372 | A1* | 9/2010 | Wu | 455/436 |
| 2010/0260096 | A1* | 10/2010 | Ulupinar et al. | 370/315 |
| 2010/0331037 | A1* | 12/2010 | Jen | 455/522 |
| 2011/0032890 | A1* | 2/2011 | Wu | 370/329 |
| 2011/0051654 | A1* | 3/2011 | Blankenship et al. | 370/315 |
| 2011/0051656 | A1* | 3/2011 | Hethuin et al. | 370/315 |
| 2011/0053490 | A1* | 3/2011 | Wu | 455/3.01 |
| 2011/0081898 | A1* | 4/2011 | Park | 455/418 |
| 2011/0158156 | A1* | 6/2011 | Ma et al. | 370/315 |
| 2011/0243037 | A1* | 10/2011 | Sundstrom et al. | 370/279 |
| 2011/0286411 | A1* | 11/2011 | Kim et al. | 370/329 |
| 2011/0317614 | A1* | 12/2011 | Park et al. | 370/315 |
| 2012/0015659 | A1* | 1/2012 | Kalyani et al. | 455/436 |
| 2012/0039299 | A1* | 2/2012 | Teyeb et al. | 370/315 |
| 2012/0039302 | A1* | 2/2012 | Chun et al. | 370/331 |
| 2012/0069793 | A1* | 3/2012 | Chung et al. | 370/315 |
| 2012/0087257 | A1* | 4/2012 | Larsson et al. | 370/252 |
| 2012/0087396 | A1* | 4/2012 | Nimbalker et al. | 375/219 |
| 2012/0094651 | A1* | 4/2012 | Chun et al. | 455/422.1 |
| 2012/0114021 | A1* | 5/2012 | Chung et al. | 375/211 |
| 2012/0140702 | A1* | 6/2012 | Takano | 370/315 |
| 2012/0140726 | A1* | 6/2012 | Moon et al. | 370/329 |
| 2012/0147794 | A1* | 6/2012 | Chung et al. | 370/280 |
| 2012/0147831 | A1* | 6/2012 | Golitschek | 370/329 |
| 2012/0163288 | A1* | 6/2012 | Kim et al. | 370/315 |
| 2012/0170507 | A1* | 7/2012 | Sawai | 370/315 |
| 2012/0176958 | A1* | 7/2012 | Queseth et al. | 370/315 |
| 2012/0182950 | A1* | 7/2012 | Chung et al. | 370/329 |
| 2012/0196528 | A1* | 8/2012 | Kazmi et al. | 455/9 |
| 2012/0207079 | A1* | 8/2012 | Wang et al. | 370/315 |
| 2012/0213145 | A1* | 8/2012 | Aminaka et al. | 370/312 |
| 2012/0236783 | A1* | 9/2012 | Park et al. | 370/315 |
| 2012/0250605 | A1* | 10/2012 | Du et al. | 370/315 |
| 2012/0257531 | A1* | 10/2012 | Ko et al. | 370/252 |
| 2012/0300654 | A1* | 11/2012 | Gan et al. | 370/252 |
| 2012/0307757 | A1* | 12/2012 | Edler Von Elbwart et al. | 370/329 |
| 2012/0327801 | A1* | 12/2012 | Seo et al. | 370/252 |
| 2013/0010684 | A1* | 1/2013 | Park et al. | 370/315 |
| 2013/0012217 | A1* | 1/2013 | Suda | 455/450 |
| 2013/0040558 | A1* | 2/2013 | Kazmi | 455/9 |
| 2013/0058240 | A1* | 3/2013 | Kim et al. | 370/252 |
| 2013/0083719 | A1* | 4/2013 | Seo et al. | 370/312 |
| 2013/0089043 | A1* | 4/2013 | Lunttila et al. | 370/329 |
| 2013/0090121 | A1* | 4/2013 | Zhang et al. | 455/450 |
| 2013/0115968 | A1* | 5/2013 | Wegmann et al. | 455/452.1 |
| 2013/0121299 | A1* | 5/2013 | Kim et al. | 370/329 |
| 2013/0135988 | A1* | 5/2013 | Kim et al. | 370/216 |
| 2013/0163527 | A1* | 6/2013 | Lunttila et al. | 370/329 |
| 2013/0176981 | A1* | 7/2013 | Earnshaw et al. | 370/329 |
| 2013/0182676 | A1* | 7/2013 | Lee et al. | 370/329 |
| 2013/0188552 | A1* | 7/2013 | Kazmi et al. | 370/315 |
| 2013/0223400 | A1* | 8/2013 | Seo et al. | 370/329 |
| 2013/0230013 | A1* | 9/2013 | Seo et al. | 370/329 |
| 2013/0235839 | A1* | 9/2013 | Kim et al. | 370/329 |
| 2013/0250900 | A1* | 9/2013 | Gora et al. | 370/329 |
| 2013/0272190 | A1* | 10/2013 | Du et al. | 370/315 |
| 2013/0315109 | A1* | 11/2013 | Raaf et al. | 370/277 |
| 2014/0119323 | A1* | 5/2014 | Chung et al. | 370/329 |
| 2014/0148176 | A1* | 5/2014 | Raaf et al. | 455/445 |
| 2014/0301370 | A1* | 10/2014 | Sivavakeesar | 370/331 |
| 2014/0307586 | A1* | 10/2014 | Zhang et al. | 370/254 |
| 2014/0321282 | A1* | 10/2014 | Pragada et al. | 370/235 |

OTHER PUBLICATIONS

3rd Generation Partnership Project. 3GPP TR 36.814, V9.0.0 (Mar. 2010). 3rd Generation Partnership Project; Technical Specification Group Radio Access Network; Evolved Universal Terrestrial Radio Access (E-UTRA); Further advancements for E-UTRA physical layer aspects (Release 9). Mar. 2010.

3rd Generation Partnership Project. 3GPP TS 36.101, V10.1.0 (Dec. 2010). 3rd Generation Partnership Project; Technical Specification Group Radio Access Network; Evolved Universal Terrestrial Radio Access (E-UTRA); User Equipment (UE) radio transmission and reception (Release 10). Dec. 2010.

3rd Generation Partnership Project. 3GPP TS 36.104, V10.0.0 (Sep. 2010). 3rd Generation Partnership Project; Technical Specification Group Radio Access Network; Evolved Universal Terrestrial Radio Access (E-UTRA); Base Station (BS) radio transmission and reception (Release 10). Sep. 2010.

3rd Generation Partnership Project. 3GPP TS 37.104, V10.1.0 (Dec. 2010). 3rd Generation Partnership Project; Technical Specification Group Radio Access Networks; E-UTRA, UTRA and GSM/EDGE; Multi-Standard Radio (MSR) Base Station (BS) radio transmission and reception (Release 10). Dec. 2010.

* cited by examiner

CAPABILITY REPORTING FOR RELAY NODES IN WIRELESS NETWORKS

RELATED APPLICATION

This application claims priority to U.S. Provisional Application Ser. No. 61/432,633, filed 14 Jan. 2011, the entire contents of which are incorporated by reference herein.

TECHNICAL FIELD

The present invention relates generally to the use of relay nodes in wireless communication networks, and more particularly relates to techniques for the reporting of relay node capabilities, including capabilities for supporting multiple frequency bands, in these networks.

BACKGROUND

A relay node (RN) in a wireless communication system sits between one or more mobile stations (user equipment, or "UEs," in 3GPP terminology) and a conventional base station in a wireless network, and is used to receive and re-transmit, i.e., forward, signals sent by the base station and intended for mobile stations, as well as to receive signals transmitted by the mobile stations, for forwarding to the wireless network. A number of UEs can be served by a single relay. One objective of the relay node is to enhance the radio access coverage in both the uplink (mobile station to base station transmissions) and downlink (base station to mobile station transmissions).

In the "Long-Term Evolution" (LTE) systems developed by the 3rd-Generation Partnership Project (3GPP), the specified architectures for relay node connectivity include a RN connected wirelessly to a "donor cell" of a "donor base station." Base stations are known as eNodeB's, or eNB's, in 3GPP terminology, thus the donor eNB is referred to herein as a DeNB. The connection to the donor eNB is via a radio backhaul link. Simultaneously, one or more UEs may be connected to the RN, via the radio access link.

Figure 1:
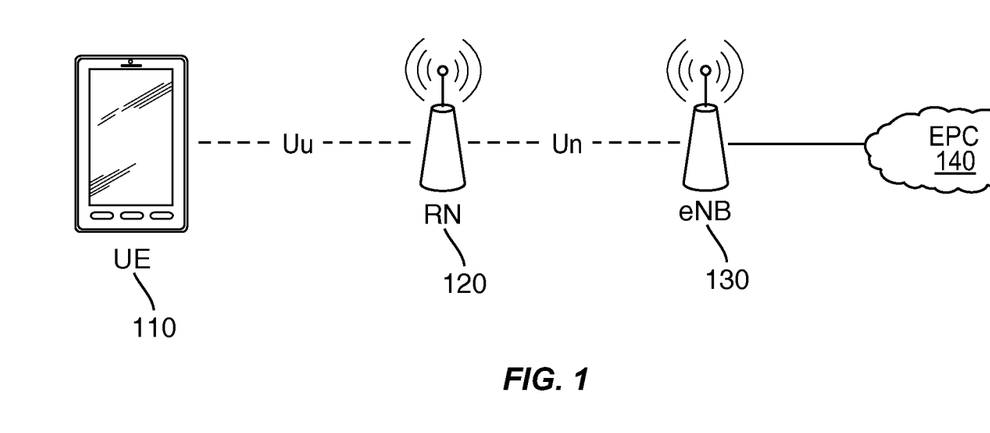
FIG. 1 illustrates the components of a single-hop relay node architecture in an LTE network.

In LTE, the backhaul link (DeNB-RN link) and access link (RN-UE link) are called the Un and Uu interfaces respectively. FIG. 1 illustrates the connections among the various nodes in a network that includes relay nodes. In this straightforward configuration, UE 110 communicates (wirelessly) with RN 120 over the Uu interface, which is the access link. RN 120 in turn communicates (wirelessly) with eNB 130 over the Un interface, which is the backhaul link. eNB 130, in its turn, is connected to the Evolved Packet Core (EPC) 140, using the standard interfaces developed by 3GPP.

In practice, the RN may be fixed or movable. Both of these types of RN are wireless RN in that they receive and transmit wireless signals over the access and backhaul links. A "fixed" RN is stationary or immovable. For simplicity, the generic term RN or relay is used throughout this document. In some cases, a movable RN may be implemented as a standalone mobile relay, i.e., as a wireless device dedicated to operation as an RN. In other cases, a wireless terminal that is capable of providing end-user services, whether to a user or to a machine, such as in a machine-to-machine context, may also act as a relay. In some cases, a mobile relay may be deployed in a moving vehicle such as a bus, train, ferry, or the like, in which case it may primarily serve UEs that are aboard the movable vehicle. However, a moving mobile relay may also serve UEs in surrounding areas.

SUMMARY

In various embodiments of the present invention, an out-of-band relay node reports its composite operating band capability to a donor node, such as a donor base station, or to another network node. The reported information indicates separate frequency band support for each of the backhaul and access links, which may operate over different frequency bands. In some embodiments, a network node that is controlling the relay node (for example, a donor base station, an O&M node, an OSS node, a SON node, or another relay node in multi-hop relay) requests the relay node to report its backhaul link and access link operating frequency band capabilities to the controlling node or to another network node. Correspondingly, other embodiments include a relay node that reports its frequency band capabilities for the backhaul link and access link to a network node, perhaps, but not necessarily, in response to a request.

In some embodiments, a network node that receives the reported frequency capability information selects appropriate frequency bands for access and backhaul link operations, based on the reported band capability, and configures the relay node to operate its access link and backhaul link over the carrier frequencies that belong to the selected frequency bands. In these and other embodiments, the received relay frequency band capability information and/or the selected bands for the backhaul and access links may also be used for one or more other network management functions such as radio resources management, network planning, dimensioning, coverage enhancement, etc.

Methods and corresponding apparatus are disclosed for managing a wireless communication network that includes a wireless relay node for processing wireless transmissions to and from one or more access terminals, or to and from one or more other relay nodes, or to and from one or more of both, via an access link, and for processing wireless transmissions to and from a donor base station, via a backhaul link. An example method begins with the sending of a request for a frequency band capability report to a relay node. However, some relay nodes may be configured to automatically report frequency band capabilities, without an explicit request. For this reason, this sending feature is omitted in other example methods.

Whether in response to an explicit request or simply sent on an automatic basis, a frequency band capability report is received from the relay node. This report indicates separate frequency band capabilities for the access link and the backhaul link. This information is then applied to one or more network management tasks. In some cases, the network node that receives and applies the frequency band capability information is the donor base station. The one or more network management tasks in this case may include selecting frequency bands for the access link and the backhaul link, based on the reported frequency band capabilities, and configuring the relay node to operate the access link and the backhaul link using the selected frequency bands. More generally, the network management tasks to which the frequency band capability information may be applied include: radio resources management tasks; network planning; network dimensioning; and coverage enhancement.

In some cases the received report indicates a separate frequency band capability for a relay-to-relay link supported by the relay node. Various reporting formats may be used in these and other embodiments. Thus, in some embodiments the report includes one or more band identifiers for each of the access link and the backhaul link, where the one or more band identifiers correspond to frequency bands according to a predefined mapping. Alternatively, the report may include one or more band identifiers, where the network node determines which of the band identifiers corresponds to each of the backhaul link and the access link, according to a predefined rule, such as a rule indicating that a particular band identifier corresponds to a range of frequency bands, or a rule providing a different mapping for the band identifiers depending on the type of relay. Thus, in some of these embodiments, the report further comprises a configuration scenario identifier, and the receiving network node determines which of the band identifiers corresponds to each of the backhaul link and the access link according to the configuration scenario identifier and the predefined rule. In others of these embodiments, the network node determines which of the band identifiers corresponds to each of the backhaul link and the access link according to a predefined rule that varies according to a type of the relay node.

Another example of a method for managing a wireless communication network that includes one or more relay nodes is suitable for implementation at a relay node. In some embodiments, the method begins with receiving a request for a frequency band capability report—as discussed earlier, some embodiments will omit this operation. Next, a frequency band capability report is transmitted, over the backhaul link towards the fixed network. This report indicates separate frequency band capabilities for the access link and the backhaul link of the relay node.

In some embodiments, such as in a multi-hop relay, the report further indicates a separate frequency band capability for a relay-to-relay link supported by the relay node. In various embodiments, the report includes one or more band identifiers for each of the access link and the backhaul link, where the one or more band identifiers correspond to frequency bands according to a pre-defined mapping. Likewise, the report may include one or more band identifiers, in some cases, and further include a configuration scenario identifier, where the configuration scenario identifier indicates which of the band identifiers corresponds to each of the backhaul link and the access link according to a predefined rule.

Relay node and network node apparatus corresponding generally to the methods summarized above are also disclosed, and include processing circuits configured to carry out one or more of the techniques described herein for signaling and processing frequency band capability information. Of course, those skilled in the art will appreciate that the present invention is not limited to the features, advantages, contexts or examples summarized above, and will recognize additional features and advantages upon reading the following detailed description and upon viewing the accompanying drawings.

DETAILED DESCRIPTION

Various embodiments of the present invention are now described with reference to the drawings, wherein like reference numerals are used to refer to like elements throughout. In the following description, numerous specific details are set forth for purposes of explanation, in order to provide a thorough understanding of one or more embodiments. It will be evident to one of ordinary skill in the art, however, that some embodiments of the present invention may be implemented or practiced without one or more of these specific details. In other instances, well-known structures and devices are shown in block diagram form in order to facilitate describing embodiments.

Note that although terminology from 3GPP's specifications for LTE and LTE-Advanced is used throughout this disclosure to exemplify the invention, this should not be seen as limiting the scope of the invention to only these systems. Other wireless systems including or adapted to include relay nodes may also benefit from exploiting the ideas covered within this disclosure.

Also note that terminology such as "base station," "eNodeB," "mobile station," and "UE" should be considered non-limiting as applied to the principles of the invention. In particular, while detailed proposals applicable to LTE are described here, the described techniques may be applied to other wireless networks, of various topologies and radio technologies. Accordingly, the term "user equipment" or "UE" should be interpreted broadly, to include various types of radio access equipment (radio devices used to access a wireless network) including cell phones, fixed wireless terminals, wireless adapters for use with portable computers, wireless access devices built into or intended for use with laptop computers, tablet computers, and the like, as well as wireless access devices used in so-called machine-to-machine (M2M) applications. Likewise, while the discussion that follows may use the terms evolved NodeB, Node B, DeNB, and the like, those terms should be understood broadly to apply to any base station or other wireless network access point configured according to the inventive techniques.

The illustration in FIG. 1 depicts a single-hop relay architecture, the details of which are currently being specified by 3GPP for LTE networks. Currently, LTE does not specify multi-hop capability for relays. However, one extension of the relay technique is to deploy multiple relay nodes between the served UE and the eNB. Multi-hop relays are well known in other communications contexts. Information sent to the UE from the fixed network "hops" from the donor base station through multiple RNs, until it reaches the UE. In a similar manner, information sent from the UE traverses multiple RN on the way to the donor base station. It should be noted that a multi-hop relay system may comprise any or several of the various types of relays discussed above, including fixed relays, movable relays or a combination of fixed and movable relays. For example, in a two-hop relay deployment scenario, a fixed relay might be used for the first hop while a movable relay is the used for the second hop, or vice-versa.

Figure 2:
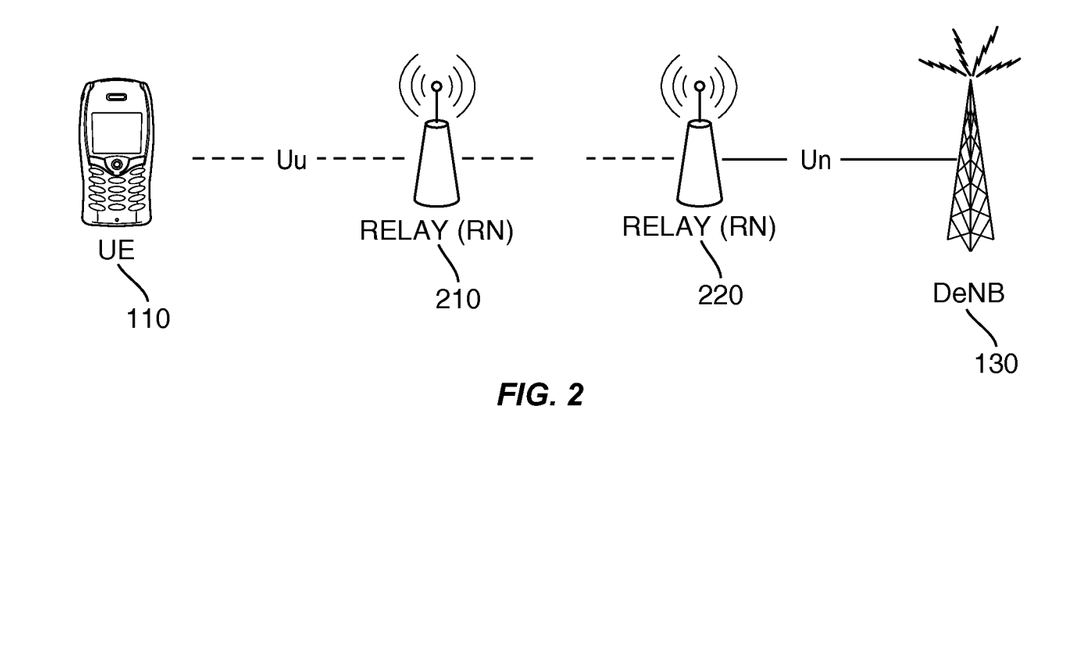
FIG. 2 illustrates components of a dual-hop relay node architecture in an LTE network.

FIG. 2 illustrates the multi-hop relay concept based on two hops, as it might appear in an LTE network. In the example system illustrated in FIG. 2, UE 110 communicates with RN 210, over the Uu interface. RN 210 in turn communicates with RN 220, which finally communicates with DeNB 130, over the Un interface.

A single- or multi-hop relay system can be employed in any system, e.g., a High-Speed Packet Access (HSPA) network (i.e., UTRA FDD and UTRA TDD), GSM (including GERAN/EDGE), 3GPP2 CDMA technologies (e.g., CDMA2000 and HRPD) or a multi-radio-access-technology (multi-RAT) carrier aggregation (CA) system such as HSPA-LTE CA, etc.

Figure 3:
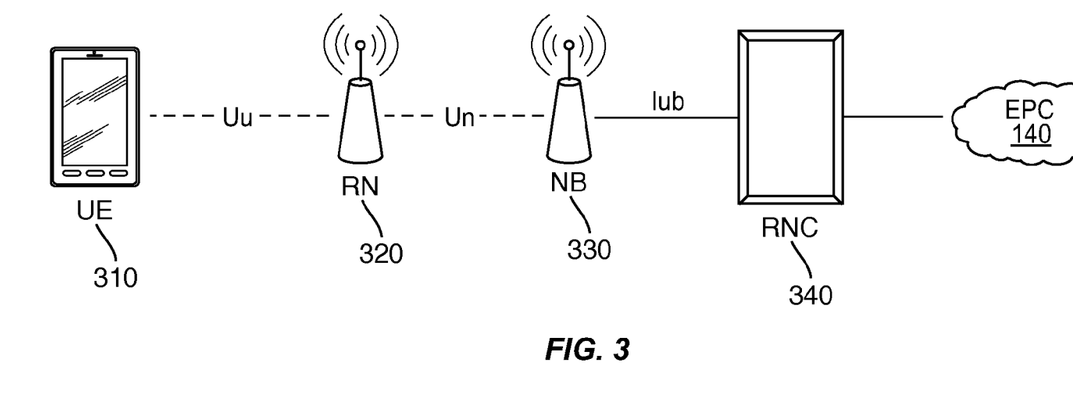
FIG. 3 illustrates components of a relay node architecture in an HSPA network.

Relay architectures similar to those shown in FIGS. 1 and 2 may also be employed in other technologies such as in HSPA FDD/TDD, GSM/GERAN, CDMA2000/HRPD, WiMax etc. However the relay architecture may be slightly different in other technologies. In general, a RN is connected via backhaul link to any type of donor base station (e.g., belonging to HSPA, GSM, CDMA200, WiMax technology etc). For example, FIG. 3 illustrates a possible relay architecture for an HSPA network. In this figure, a UE 310 is connected to an RN 320 that supports HSPA services. RN 320 is connected to the Node B 330, which in turn is connected to a radio network controller (RNC) 340, via the Iub interface.

The operation of a wireless relay node can be classified into two categories with respect to usage of the radio spectrum. The first category is the "in-band relay." In this case, the backhaul link and the access link operate using the same carrier frequency. Typically, the communication over the backhaul and access links are time-domain multiplexed. However, in principle simultaneous operation over the two links may also be possible provided sufficient isolation between the access and backhaul links are achieved, e.g., by the virtue of directive transmission, or by introducing another multiplexing technique such as code-division multiplexing. The second category is the "out-of-band" or "out-band relay." In this case, the backhaul link and the access link operate using different carrier frequencies, i.e., the backhaul and the access link are separated in the frequency domain. The carrier frequencies may belong to the same general radio frequency band, or to completely different frequency bands.

A concept called carrier aggregation (CA) is being introduced in 3GPP wireless networks, and is used to aggregate two or more component carriers for supporting high data rate transmissions over a wide bandwidth. For instance, CA in LTE is expected to provide up to 100 MHz of bandwidth to a single UE. CA may be used in the radio downlink, uplink, or in both directions.

Carrier aggregation technology is also referred to as, in various contexts, "multi-carrier systems", "multi-carrier operation", and/or "multi-carrier" transmission and/or reception.

Often, the component carriers in carrier aggregation belong to the same technology. For instance, all of the component carriers in a given deployment may all be WCDMA carriers or may all be LTE carriers. However, carrier aggregation between carriers of different technologies may also be used to increase data throughput. For example, the carriers from WCDMA and LTE may be aggregated. Another example is the aggregation of LTE and CDMA2000 carriers. Carrier aggregation between carriers of different technologies is also referred to as "multi-RAT carrier aggregation" or "multi-RAT-multi-carrier system" or simply "inter-RAT carrier aggregation". For the sake of clarity, carrier aggregation within the same technology may be regarded as "intra-RAT" or simply "single-RAT" carrier aggregation.

There are two general cases or types of carrier aggregation. A first general case is continuous carrier aggregation; a second general case is non-continuous carrier aggregation. In continuous carrier aggregation, the available component carriers are adjacent to each other, e.g., adjacent to one another in the same frequency band. In non-continuous carrier aggregation the aggregated component carriers are separated along the frequency band.

In both cases, multiple component carriers are aggregated to serve a single user equipment unit (UE). According to existing spectrum allocation policies and the fact that the spectrum resource in the low frequency bands is scarce, it is difficult to allocate continuous 100 MHz bandwidth for a mobile network. Therefore, the non-continuous carrier aggregation technique provides a practical approach to enable mobile network operators to fully utilize their (often scattered) spectrum resources. Non-continuous carrier aggregation deployments are typically further categorized as (1) multiple (non-contiguous) component carriers that are separated such that they belong to different frequency bands, and (2) multiple (non-contiguous) component carriers that are within the same frequency band.

Yet a third carrier aggregation category is also possible: a hybrid of contiguous and non-contiguous carriers. For example, a hybrid CA deployment may include two or more adjacent carriers in one frequency band (e.g., band A) and one or more contiguous or non-contiguous carriers in another frequency band (e.g., band B).

CA may also be used in the relay environment to increase the data rate over the backhaul and/or access links. Furthermore, carrier aggregation may be used in both in-band and out-band relays.

Often, more than one relay node is connected to the same donor base station. The relays are generally deployed in the coverage area of the donor cell. Since the primary function of relay node is for coverage improvement, both outdoor and indoor relay deployment scenarios are beneficial under various circumstances. For instance, an outdoor relay can be used for improvement of cell edge coverage. The indoor relay, on the other hand, might be used for addressing indoor dead spots, or serving indoor hot spots.

Furthermore, whether the relay is deployed outdoors or indoors, the antennas used for the backhaul and access links may either be in the indoors or outdoors. In other words, any combination of indoor/outdoor antennas and indoor/outdoor relay is possible in principle. In addition, the same or different MIMO configurations may be used in the access link and the backhaul link. Thus, for example, a relay may use two transmit and two receive antennas for the access link, and four transmit and four receive antennas on the backhaul link.

Figure 4A:
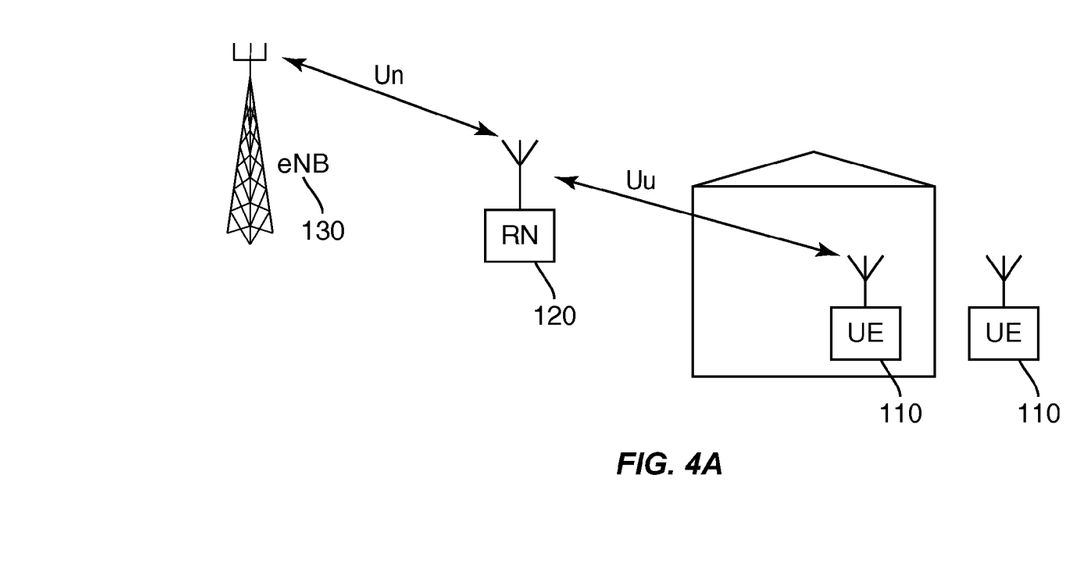
FIGS. 4A, 4B, and 4C illustrate example deployment scenarios for relay nodes.
Figure 4B:
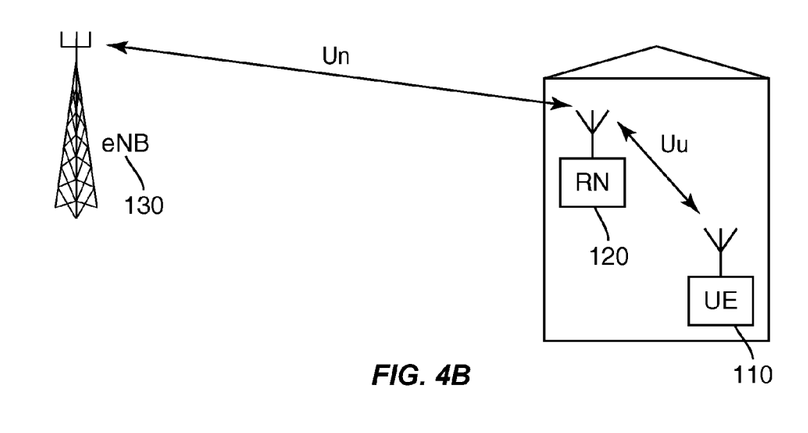
Figure 4C:
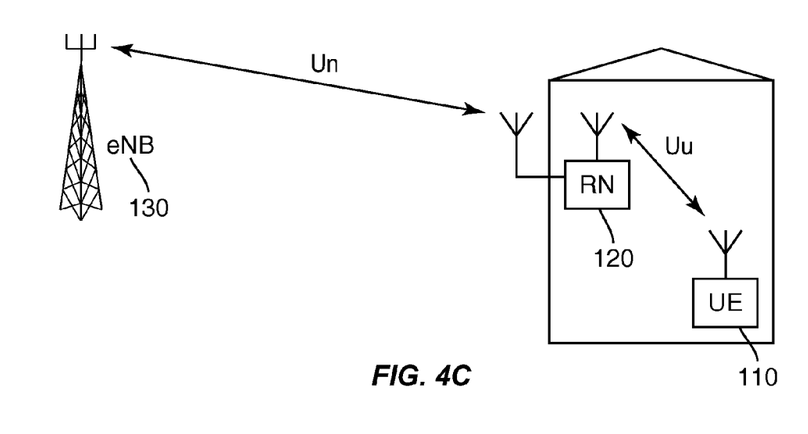

Examples of three relay deployment scenarios are illustrated in FIGS. 4A-4C. In FIG. 4A, the relay 120 is deployed outdoors; all the relay antennas for the transmission and reception of signals over the backhaul and access links are also located in the outdoors. The outdoor relay 120 serves outdoor and indoor users. In FIG. 4B, the relay 120 is deployed indoors; all the relay antennas for the transmission and reception of signals over the backhaul and access links are also located in the indoors. The indoor relay 120 primarily serves indoor users. Finally, in FIG. 4C, the relay 120 is deployed indoors. The relay antennas for the transmission and reception of signals over the backhaul link are located outdoor. However the antennas for the access link are located indoors. This type of relay deployment is also called a Truwall (through wall, or thru-wall), and is usually meant to primarily serve the indoor users. The use of outdoor backhaul antennas results in improved backhaul link quality, e.g., compared to pure indoor deployment. It should be noted that deployment scenarios are not limited to the three scenarios illustrated in FIGS. 4A-4C. Further, multiple antennas may be used for receive and/or transmit operations on either or both of the access and backhaul links; still further, the number of antennas used for transmit and receive transmits may differ in any given relay 120, as may the number of antennas used for the access link and the backhaul link.

A relay node may also be a multi-standard radio (MSR). A MSR relay contains common radio frequency (RF) components (e.g., power amplifiers, RF filters) which can be used selectively to operate simultaneously with more than one RAT or using more than one carrier within the same RAT. The MSR relay may also be termed a multi-carrier, multi-standard radio (MC-MSR) base station, due to the fact that it may sometimes support a single RAT, with more than one carrier.

Hence, a single-RAT MSR is a special case of the MSR. A single-RAT MSR relay may support one or more carriers of the same RAT. Hence, another special case of a MSR relay is a relay that supports a single carrier within a RAT, i.e., single-carrier, single-RAT MSR relay. Similarly, a multi-carrier single-RAT MSR relay supports more than one carrier of the same RAT. A single-RAT MSR relay may differ from a conventional (non-MSR) single-RAT relay due to differences in some of the radio requirements. The MSR node has generic radio requirements. The MSR relay may support frequency-division duplexing (FDD) or time-division duplexing (TDD). Examples of RATs that might be supported in a FDD MSR relay are: LTE FDD, UTRA FDD and GSM. Another example is: LTE FDD and 3GPP2 CDMA technologies (e.g., CDMA200 and HRPD). Examples of RATs that might be supported in a TDD MSR relay are: LTE TDD and UTRA TDD.

The carriers within a FDD or TDD MSR relay may be contiguous or non-contiguous. Furthermore such relay may be used in single hop or in multiple hop relay system. It will be appreciated that all of the techniques disclosed herein for managing relay nodes in wireless networks apply to relays of any of the types discussed above, including relay nodes that are based on the MSR principle.

A relay may operate on the same operating frequency bands that are specified for the base station, depending upon the supported technology. For example, the LTE TDD relay may operate on E-UTRA TDD operating frequency band 40 (2.3 GHz). Similarly, as an example, the LTE FDD relay may operate on E-UTRA FDD operating frequency band 1 (2 GHz). The MSR FDD relay supporting UTRA and E-UTRA may operate on MSR FDD operating frequency bands, e.g., on band 7 (2.6 GHz). Similarly, the MSR FDD relay supporting GSM, UTRA and E-UTRA may operate on MSR band 3 (1800 MHz). Details for each of these radio access technologies may be found in: 3GPP TS 36.101, "Evolved Universal Terrestrial Radio Access (E-UTRA) and Evolved Universal Terrestrial Radio Access (E-UTRAN); User Equipment (UE) radio transmission and reception"; 3GPP TS 36.104, "Evolved Universal Terrestrial Radio Access (E-UTRA) and Evolved Universal Terrestrial Radio Access (E-UTRAN); Base station (base station) radio transmission and reception"; and 3GPP TS 37.104, "E-UTRA, UTRA and GSM/EDGE; Multi-Standard Radio (MSR) Base Station (base station) radio transmission and reception," all of which may be found at the 3GPP website at http://www.3gpp.com/specifications.

Presently, the frequency bands specified for various 3GPP technologies range between 700 MHz (e.g., FDD band 13) to 3500 MHz (TDD band 42). In the near future, frequency bands in the range of 400 MHz and 4 GHz may also be specified. There are two important observations arising from this range of supported frequencies. First, there can be large differences between the frequencies of different bands. For instance, even within the same region, E-UTRA band 1 is at approximately 2 GHz, while E-UTRA band 8 is at 900 MHz. Similarly, E-UTRA band 2 and band 13 are frequency ranges corresponding to 1900 MHz and 700 MHz, respectively, and may co-exist in the same region. Another example of a significant frequency difference is that between the 800 MHz and 3.5 GHz bands, which may also be operated in the same region.

Secondly the influence of carrier frequency on cell coverage or path loss is well known. If all other factors are equal, cell coverage is significantly better at lower carrier frequencies. According to the free space model, the frequency dependency on path loss is given by (1):

$$\Delta L = 20 \log_{10}\left(\frac{F_1}{F_2}\right), \quad (1)$$

where $\Delta L$ is the path loss difference between carrier frequencies F1 and F2, assuming the same distance between the transmitter and receiver.

If, for example, F1=1800 MHz and F2=900 MHz, then according to Equation (1) the path loss difference in free space is approximately 6 dB. For the bands 450 MHz and 3500 MHz, the difference in free space is approximately 18 dB. In practice, and depending upon the radio environment, the path loss difference between carrier frequencies is typically even larger than that expressed by Equation (1). For instance, the mean path loss difference between 900 MHz and 1800 MHz is about 7 dB and 9-10 dB in urban and sub-urban areas, respectively.

According to 3GPP assumptions, the path loss relations for 900 MHz (UMTS band VIII) and 2000 MHz (UMTS band I) and the corresponding difference in the path loss at the same distance between UE and the base station are shown in Table 1. Similarly, for the same reported path loss at different frequencies (900 and 2000 MHz) the difference in distance is approximately 1.6 km. Thus, the coverage of the relay is highly affected by the choice of the operating band.

TABLE 1

Relative coverage loss of 2000 MHz, with respect to 900 MHz, using 3GPP assumptions.

| Frequency band | Carrier Frequency [MHz] | Path Loss [dB] | Loss relative to 900 MHz [dB] at same R | Difference in distance [km] relative to 900 MHz for same PL, i.e., L1 = L2 |
|---|---|---|---|---|
| UMTS/LTE VIII | 900 | L1 = 120.9 + 37.6 * log10(R) | 0 | 0 |
| UMTS/LTE I | 2000 | L2 = 128.1 + 37.6 * log10(R) | 7.2 dB | 1.6 |

R is distance in km between base station and UE

As discussed above, the backhaul link and the access link of an out-of-band relay operate on different carrier frequencies. The relay node can report its capability in terms of the supported frequency bands to the donor or controlling node, such as the donor eNodeB in LTE. A relay is also capable of operating over all carrier frequencies in a given supported band. For instance, a relay can use all carrier frequencies in band 1, if it supports band 1 at all. It is up to the controlling node, such as the donor base station, to configure the relay with appropriate frequencies for the access link and backhaul link operations. However no signaling means or mechanism presently exists for enabling the relay to report its capability, e.g., to indicate that it supports different frequency bands for the backhaul or access links.

Accordingly, in various embodiments of the present invention, an out-of-band relay node reports its composite operating band capability to the donor base station (or to other relevant network nodes) separately for backhaul and access links, which may each operate over different frequency bands. There are several related techniques, each of which is described in further detail herein. For instance, in one approach a first network node that is controlling the relay node (for example, a donor base station, an O&M node, an OSS node, a SON node, or another relay node in multi-hop relay) requests the relay node to report its backhaul link and access link operating frequency band capabilities to the network node. Correspondingly, a relay node reports its frequency band capabilities for the backhaul link and access link to a network node, perhaps (but not necessarily) in response to a request.

In some embodiments, a network node that receives the reported frequency capability information selects appropriate frequency bands for access and backhaul link operations, based on the reported band capability and configures the relay node to operate its access link and backhaul link over the carrier frequencies that belong to the selected frequency bands. In these and other embodiments, the received relay frequency band capability information and/or the selected bands for the backhaul and access links may also be used for one or more other network management functions such as radio resources management, network planning, dimensioning, coverage enhancement, etc.

The inventive techniques disclosed herein are applicable to single-hop as well as to multi-hop relays. In multi-hop systems, for example, an end relay may report its composite frequency band capability (i.e., its capabilities with respect to both the access link and the backhaul link) to the donor node via an intermediate relay, either transparently, where the intermediate relay is unaware of the reports, or non-transparently, where the intermediate relay is aware of the reports. In these systems, intermediate relays may also report their composite capabilities to the donor node. For example, an intermediate relay may report frequency bands supported by all nodes between the end relay and the reporting intermediate relay.

In short, the techniques disclosed herein enable the relay to separately report its operating frequency bands capabilities for all links (access and backhaul) to the donor base station or to other network nodes. The reported backhaul and access link frequency band capability information can be used for various purposes: radio resource management, network planning/dimensioning, etc.

In various embodiments of the present invention, the relay node is able to report its composite operating frequency band to the donor base station (or other relevant network nodes) separately for backhaul and access links. This enables the out-of-band relay to operate its access link and backhaul links over frequencies belonging to different operating frequency bands. This is perhaps best explained by the following non-limiting example.

Consider that an out-of-band FDD relay node supports three frequency bands: band 1 (2 GHz), band 7 (2.6 GHz) and band 8 (900 MHz). However, while the relay node may support backhaul link operation over frequency bands 1 and 7, the access link can operate only over the frequency band 8. In another example, the relay node supports band 1 and band 8 for the backhaul and access links, respectively. In either of these configurations, the inventive techniques disclosed herein enable the relay node to explicitly indicate to the controlling network node (e.g., the donor eNodeB) the separate supported frequency bands for the backhaul and access link operations.

There are various manners in which the relay composite operating frequency band capability can be reported, as described in the following examples.

Reporting of band identifiers mapped to different links—According to one approach, the relay node simply reports to the network node the identifiers of the frequency bands (i.e., band numbers) over which the relay node can support backhaul link and access link operations. This is illustrated in Table 2. The mapping between available frequency bands and the frequency band identifiers or the band numbers used to report are pre-defined, so that the relay node and the network node receiving the report are in agreement as to the meaning of the report.

TABLE 2

Example of relay composite band capability reporting
Supported frequency band identifiers/band numbers

| Backhaul link | Access link |
| --- | --- |
| 1, 3 and 7 | 1, 3, 8 and 20 |

As illustrated in Table 2, for certain bands the relay node may support operation on both backhaul link and access link. However, certain bands are exclusively supported on either backhaul link or access link. It is up to the network to configure the relay on suitable bands for the backhaul and access links as described later.

Composite band reporting for multi-hop relay—In some embodiments, a multi-hop relay may support the same frequency bands on all the backhaul links, i.e., same bands on relay-donor node and relay-relay links as expressed, for example, in Table 2.

According to another alternative, the multi-hop relay may support different sets of frequency bands over different backhaul links. However, depending upon the implementation, some of the bands may be common among two or more different backhaul links. In this example, the relay will report all supported bands without relating them to any particular link, e.g., bands 1, 3 and 7 in this example. This second alternative is shown in Table 3.

TABLE 3

Example of relay composite band capability reporting in multi-hop
Supported frequency band identifiers/band numbers

| Backhaul link to | | Access link |
| --- | --- | --- |
| Donor node | Other node | |
| 1, 3 and 7 | 3 and 7 | 1, 3, 8 and 20 |

Reporting of frequency band range identifier—The objective of this reporting method is to reduce the signaling overhead compared to the previous approaches, in the event that the supported bands on different links have unique frequency range. Assume, for example, that the relay supports frequency bands below 1 GHz for access link and frequencies above 1 GHz for backhaul link. In this case, the relay may report at least two sets of information. First, the relay reports identifiers for all supported bands. Second, the relay reports additional information indicating that it can operate over its access link using all its supported bands below 1 GHz. This information implies that it cannot use the bands above 1 GHz for the access link.

Alternatively such a rule or configuration can also be pre-defined. In this case an indicator of such configuration can be reported by the relay to the donor node.

This mechanism of reporting can be described by an example. Consider the example configurations defined in Table 4. Such configurations, or similar ones, can be pre-defined in a standard. Now, assume a given relay supports configuration scenario number 1, as expressed in table 4. In some embodiments of the present invention, the relay shall report to the donor node its supported configuration identifier number 1. In addition, the relay will also report all supported bands, e.g., bands 1 (2 GHz), 3 (1800 MHz) and 8 (900 MHz), without relating them to a specific link. Based on this received information, the donor node is then able to identify that the relay supports bands 1 and 3 for the backhaul link and band 8 for the access link operations.

TABLE 4

Example of relay frequency band range capability reporting

| Configuration scenario ID | Relay supported frequency ranges | |
|---|---|---|
| | Backhaul link | Access link |
| 1 | 1 GHz | 1 GHz |
| 2 | >2 GHz | ≤2 GHz |
| 3 | All frequency ranges | 1 GHz |

Different tables can also be pre-defined for different types of relay deployment scenarios. For example, different tables similar to that of Table 4 may be provided for indoor relay, outdoor relay, and thruwall scenarios. Different tables can also be pre-defined for different types of relays, for fixed relays, mobile relays, wireless terminal acting as relays, and so on.

Composite band reporting for multi-hop relay—In some network configurations, a multi-hop relay may support the same frequency bands on all the backhaul links, i.e., the same bands on relay-donor node and relay-relay links. In other configurations, however, a multi-hop relay may support different sets of frequency ranges over different backhaul links. Depending upon the implementation, some of the frequency ranges (and hence bands) may overlap, or be common to different backhaul links. To support this situation, a relay can be configured to also report all supported bands without relating them to any link, i.e., bands 1, 3 and 8 in this example. This second alternative is shown in Table 5.

TABLE 5

Example of frequency band range capability reporting in multi-hop

| Configuration Scenario ID | Relay Supported Frequency Ranges | | |
|---|---|---|---|
| | Backhaul link to . . . | | |
| | Donor node | Other Relay | Access link |
| 1 | >1 GHz | ≤1 GHz | ≤1 GHz |
| 2 | >2 GHz | >2 GHz | ≤2 GHz |
| 3 | All frequency ranges | ≤1 GHz | ≤1 GHz |

A suitable network node may configure or request the relay node to report its composite operating frequency band capability for the backhaul and access links. Examples of the network nodes that may do this are a base station or donor base station (e.g., eNodeB in LTE or Node B in HSPA), a network controller (e.g., radio network controller in HSPA or base station controller in GSM), a self organizing network (SON) node, an operation and management node, a core network node (e.g., MME in LTE) or even a positioning node (e.g., E-SMLC in LTE).

In some embodiments, the network node may request the relay to report its composite operating frequency band capability either during the initial setup (i.e., when a new relay node is added to the network) or when the frequency band capability of an existing relay node is modified (e.g., upgraded or downgraded). More generally, the network node may also request the relay node to report its frequency band capability at any time, such as when it suspects the relay node capability has been modified, or when the capability information has been lost.

The network node may also specify the specific principles, or rules (described above), to be used by the relay for reporting its frequency band capability. The network node may also explicitly request that the relay report all its frequency band capability, or that it report only specific information, e.g., only supported bands for the backhaul links or specific backhaul link in case of multi-hop relay etc. Alternatively the relay may use one or more pre-defined rules to report the frequency band capability and all information as specified in pre-defined rules.

The relay node may use any of the principles outlined above to report its composite operating frequency band capability to the network node. In various embodiments, the relay node may report its frequency band capabilities to the network node under several different circumstances. For instance, the relay node may be configured to report its composite operating frequency band capability to a network node upon receiving an explicit request from the network. The network node that is to receive the frequency band capability information may be specified by the requesting node, in some embodiments. The relay may receive requests from several network nodes, in some cases, such as a donor base station, an O&M node, an SON node, and/or a positioning node.

In some embodiments, even if there is no explicit request from the network, the relay node automatically reports its composite operating frequency band capability to one or more network nodes upon initial setup or after the connection re-establishment (e.g., upon recovering from radio link failure). In these and other embodiments, the relay node can be configured to automatically report its composite operating frequency band capability (i.e., without receiving an explicit request) each time the relay node band capability is modified, such as when more bands are added. In these embodiments, the reports are sent to pre-defined nodes, which again may include any of various nodes such as the donor base station, an O&M node, a positioning node, and so on.

In some embodiments, of course, the network node that configures the relay node and/or requests a reporting of the relay node's capabilities may be the same node that receives the report. For example, in LTE the donor eNodeB may configure the relay to report its band capability, and may also receive and apply the reported capability to one or more network management tasks.

Once acquired by a node in the fixed network, the relay node's composite operating frequency band capability information may also be signaled to other network nodes. For example, assume that the donor base station acquires the relay frequency bands capability information from the relay node. The donor base station may signal this information to other nodes, such as another base station (e.g., between eNBs over X2 interface in LTE), other relay nodes, an O&M node, an SON node, a core network node (such as the MME in LTE), or a positioning node (e.g., E-SMLC in LTE or SAS node in HSPA).

In some cases, the relay node frequency band capability information between the network nodes may be sent by the source node to the target node under one or more of the following scenarios: upon explicit request from the target node; proactively, whether periodically or aperiodically; whenever the received relay frequency band capability information is modified; and/or whenever new frequency band capability information is received by the source node. Of course, other scenarios in addition to those listed above are possible.

As discussed above, a given relay node may support multiple frequency bands on each of the different links. The lists of supported bands may overlap, in some instances. For example, a relay may support band 1 and band 7 for backhaul link operation, and bands 1 and 8 for access link operation. In some cases, a controlling network node will select appropriate bands for the relay node to use for access link and backhaul link operations. After selection, the network node will configure the relay to operate its access and backhaul links on the selected frequency bands.

In one example, the network node may select the relay node with the above band capability to operate its backhaul link and the access link using bands 1 and 8, respectively. Any of several criteria may be used by the controlling network node for selecting the bands out of the supported bands for the backhaul and access link operations. For instance, radio coverage, whether actual or predicted, may be considered. The backhaul link will often have better, or more reliable, coverage, especially if the relay node is positioned so that there are line-of-sight conditions between the relay and the donor base station. In this case, the backhaul might be served by the higher frequency bands (e.g., 2 GHz), which inherently have worse coverage for a given transmitter power level. On the other hand, the access link, which may suffer from less than optimal conditions for some users, could be served by the lower frequency bands (e.g., by 900 MHz), which provide better coverage for a given power level.

Another consideration for assigning operating bands to the access and backhaul links is bandwidth. The backhaul link and access link may require different channel bandwidths depending upon the bit rate requirements over the two links. For instance, some operating bands support all or most channel bandwidths in LTE. For example, band 3 (1800 MHz) supports all LTE bandwidths, ranging from 1.4 MHz to 20 MHz. On the other hand, certain frequency bands don't support larger channel bandwidths—for example, band 8 supports only channels up to 10 MHz wide. In the event that the backhaul link traffic requirement is very high, then, the donor node may configure the relay node to operate its backhaul link over band 3, using a 20 MHz channel. Similarly, in the event that the access link traffic requirement is low or moderate, the donor node may configure the relay node to operate its access link over band 8 using 10 MHz channel.

Still another consideration for assigning operating bands is the deployment scenario. Relays can be used in different deployment scenarios, such as indoors, outdoors, in dense urban areas. These different scenarios present different radio environments. At the same time, different bands, depending upon their frequency range, also have different propagation characteristics. Some bands are thus more suitable for indoor coverage, whereas others are more suited for outdoors. For example, higher bands like band 42 (3500 MHz) can be used on the access link if the relay access link serves the users mainly in the local area or indoor environment, such as in a shopping mall.

Still other criteria are related to the type of relay, such as whether the relay is fixed or mobile, or whether a wireless terminal is acting as a relay. These characteristics may also be used to select the frequency bands for different links. In case of a mobile or wireless terminal acting as relay, the present radio conditions and/or location may also be considered in selecting the bands. For example, typically a wireless terminal when acting as relay serves users which are in close range. Hence, higher frequency bands (e.g., above 2 GHz) can be used on the access links. In case the radio conditions are poorer, the lower frequency bands (e.g., below 1 GHz) can be used for serving the users on the access link. It may also be appropriate to use higher frequency band to serve the access link in case of a mobile relay (e.g., users inside a bus or train). But it is more appropriate to use lower frequency band on the backhaul of the mobile relay. This is because varying propagation due to mobility may lead to a more challenging backhaul link.

There are several different ways in which the frequency bands can be selected by the suitable network node. One approach is a distributed selection mechanism. With this approach, the node that receives the frequency band capability information from the relay will select the frequency bands for the different links. The receiving node in this case is typically the donor node (e.g., donor eNodeB in LTE). This implies that each donor node independently selects the bands and configures the relay to operate over the selected bands.

Another approach uses a centralized selection mechanism. According to this approach, a network node other than the one that initially receives the capability information, such as a SON node, an O&M node, or the like, may select and configure the relay to operate its backhaul and access links over the selected bands. This node, which is generally a centralized node, has access to more comprehensive information about the network planning, deployment scenario, network coverage, etc., and can thus assign frequency bands in a way that accounts for the network's overall usage of resources.

A hierarchical selection mechanism of bands is still another approach. In this case, two nodes can mutually decide the frequency bands to be used on different links. For example, out of the supported bands, a centralized node can provide a donor node with a recommended list of frequency bands for the access link and backhaul link operations. The list of bands can be recommended based on suitable criteria, such as to ensure that the overall network performance is enhanced or that the required number of relays is minimized in the network. The configuring node, such as the donor base station, eventually selects the bands based on criteria that are more local in nature, such as to achieve the desired coverage, meet the bit rate requirements on different links, and so on.

As suggested above, the acquired composite operating frequency band capability information for the relay's backhaul and the access links is used by a controlling and/or configuring node to select and configure the most appropriate bands for relay operation. The acquired relay node band capability information can also be used by various network nodes for other purposes, such as radio network management, including network/cell planning or dimensioning and the like. In addition to the relay node capability information, the network can use the actual bands used on different links of the relay in the network. For example, this latter information can be provided by a donor base station to the appropriate node, or a donor base station may use the information itself for network enhancement, as elaborated below.

For instance, a network node such as donor base station (e.g., donor eNB in LTE) can use the relay's access link frequency band capability information for determining cell coverage. The donor base station or other network node may further use this information to determine the number of relay nodes required to cover the donor base station's desired coverage area. In other words, the statistics can be used to dimension the network, such as to determine the number of relay nodes required in the network.

Likewise, a network node such as donor base station or some other managing node may use the backhaul frequency band capability in determining the possible bandwidths to support for the backhaul transmission, since all bandwidths are not supported by all bands. Depending upon the supported bands, the donor base station or another node may use other means to enhance coverage, such as antenna tilting in the event that higher bands are supported. Still further, a network management node such as an SON node or an O&M node may use the relay frequency band capability in dimensioning the overall network nodes or coverage. For example, they can identify suitable number of relay nodes required in the given environment in the entire or part of the network.

The discussion above has focused primarily on single-hop relay systems, where the relay node is directly connected to the donor. However all of the techniques described above also apply to a relay system comprising multiple hops.

This means that a donor base station may request an end relay, such as RN 210 in FIG. 2, and an intermediate relay, such as RN 220 in FIG. 2, to report their frequency band capabilities on each of their respective links. Note that there may be more than one intermediate relay node and one intermediate relay may even be connected to more than one relays.

An end relay can be configured by a donor node to report its composite operating frequency band capabilities (for backhaul and access link) either transparently, where the intermediate relay may not be aware of the request, or non-transparently, where the intermediate relay may be aware of the request. In response to the request, the end relay reports its composite operating frequency band capabilities using any of the principles and techniques described earlier.

In addition, an intermediate relay node may also request an end relay to report its composite operating frequency band capabilities. Furthermore, the donor node may also separately set the frequency bands for the operation on the access and backhaul links. The end relay's composite operating frequency band capabilities may also be reported to other network nodes, e.g., to other base station, positioning nodes, etc., as described in previous sections.

An intermediate relay node may have multiple links to other relays. A given intermediate relay may also be serving users, i.e., it may also have an access link. Alternative, an intermediate relay may instead be a standalone/dedicated node acting only as a relay, in which case it may have only backhaul links.

The intermediate relay may have different composite operating frequency band capabilities for different links: backhaul links and access link. Alternatively, the supported frequency bands on some of the links may be the same. For example, the same frequency bands for the access link and backhaul link between end relay and intermediate relay may be supported. However, the other backhaul link, i.e., one between relay and donor node, may operate over different sets of frequency bands.

In several embodiments, the intermediate relay node is configured to report the supported operating frequency bands for each link, e.g., each backhaul link and access link to the donor node or to other relay nodes. As with the end relay nodes, the reporting of supported frequency bands to the donor node or other relay node can be done transparently or non-transparently. Furthermore, the reporting of the supported frequency bands for each link may take place independently in response to the request received from other nodes, e.g., donor node, other relays or other network nodes (e.g., positioning node etc). Alternatively, the reporting of the supported frequency bands for each link may be sent by the intermediate relay to other nodes proactively, i.e., even without receiving any explicit request, e.g., at the time of setup, reconfiguration, modification of one or more parameters. The intermediate relay node may use any of the principles described in previous sections to report its frequency bands capability to the donor node or to other relays or to other nodes (e.g., base station, positioning node, etc.). According to still another approach, the donor node may also be able to configure the frequency band of the intermediate relay node for each link separately.

Those skilled in the art will further appreciate that several practical embodiments of the techniques described above will include signaling methods, practiced in a base station, relay node, or both, as well as devices, including base stations and relay nodes. In some cases, the methods/techniques described above will be implemented in or in close connection with a wireless transceiver apparatus, as realized in either a base station or a relay node, or even in a mobile station configured to act as a relay node.

Figure 5:
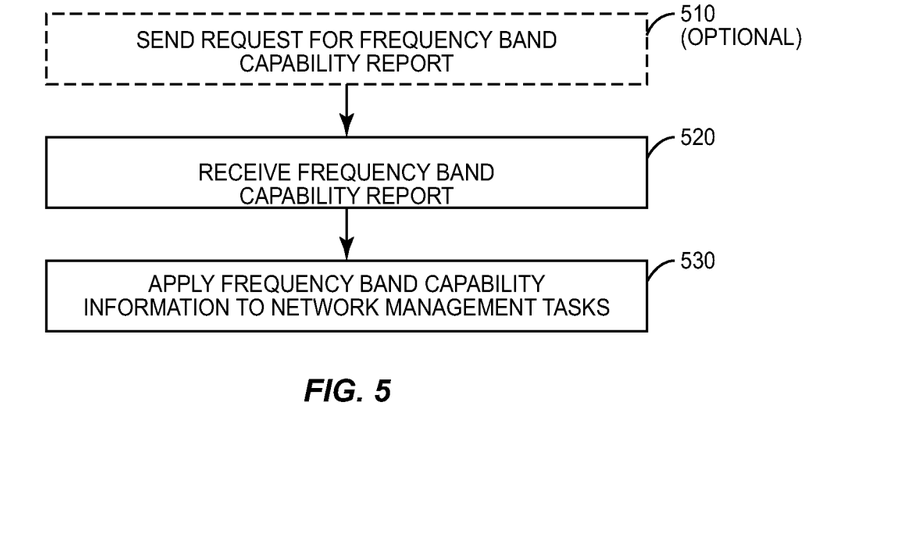
FIG. 5 is a process flow diagram illustrating a method for managing network nodes in a wireless communication network that includes a wireless relay node.
Figure 6:
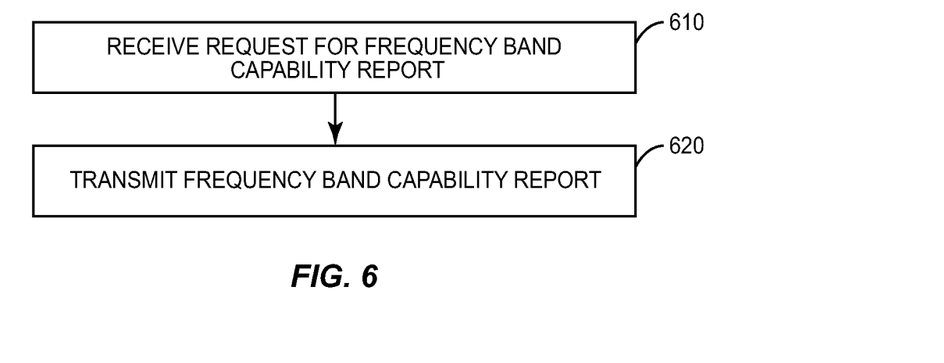
FIG. 6 is another process flow diagram illustrating a method implemented at a wireless relay node.

FIGS. 5 and 6 are process flow diagrams that illustrate generalized methods for managing a wireless communication network using the various techniques described above, as might be implemented in a configuring or controlling network node (FIG. 5) and in a relay node (FIG. 6), respectively. Those skilled in the art will appreciate that many variations of the methods illustrated in these figures are possible, and that any of the numerous techniques discussed earlier may be combined in any suitable fashion, within the general frameworks provided by these process flows.

Referring first to FIG. 5, the illustrated method is for managing a wireless communication network that includes a wireless relay node for processing wireless transmissions to and from one or more access terminals, or to and from one or more other relay nodes, or to and from one or more of both, via an access link, and for processing wireless transmissions to and from a donor base station, via a backhaul link. The illustrated method begins, as shown at block 510, with the sending of a request for a frequency band capability report to a relay node. As discussed earlier, however, some relay nodes may be configured to automatically report frequency band capabilities, without an explicit request. For this reason, the "sending" operation in block 510 is illustrated as an optional feature.

Whether in response to an explicit request or simply sent on an automatic basis, a frequency band capability report is received from the relay node, as shown at block 520. This report indicates separate frequency band capabilities for the access link and the backhaul link. As shown at block 530, this information is then applied to one or more network management tasks.

In some cases, the network node that receives and applies the frequency band capability information is the donor base station. The one or more network management tasks in this case may include selecting frequency bands for the access link and the backhaul link, based on the reported frequency band capabilities, and configuring the relay node to operate the access link and the backhaul link using the selected frequency bands. More generally, the network management tasks to which the frequency band capability information may be applied include: radio resources management tasks; network planning; network dimensioning; and coverage enhancement.

The method illustrated in FIG. 5 may be used in multi-hop networks. Thus, in some cases the received report indicates a separate frequency band capability for a relay-to-relay link supported by the relay node. Various reporting formats may be used in these and other embodiments. Thus, in some embodiments the report includes one or more band identifiers for each of the access link and the backhaul link, where the one or more band identifiers correspond to frequency bands according to a pre-defined mapping. Alternatively, the report may include one or more band identifiers, where the network node determines which of the band identifiers corresponds to each of the backhaul link and the access link, according to a predefined rule, such as a rule indicating that a particular band identifier corresponds to a range of frequency bands, or a rule providing a different mapping for the band identifiers depending on the type of relay. Thus, in some of these embodiments, the report further comprises a configuration scenario identifier, and the receiving network node determines which of the band identifiers corresponds to each of the backhaul link and the access link according to the configuration scenario identifier and the predefined rule. In others of these embodiments, the network node determines which of the band identifiers corresponds to each of the backhaul link and the access link according to a predefined rule that varies according to a type of the relay node.

FIG. 6, like FIG. 5, illustrates a method for managing a wireless communication network that includes a wireless relay node for processing wireless transmissions to and from one or more access terminals, or to and from one or more other relay nodes, or to and from one or more of both, via an access link, and for processing wireless transmissions to and from a donor base station, via a backhaul link. However, the method for FIG. 6 is suitable for implementation at a relay node. The illustrated method begins, as shown at block 610, with receiving a request for a frequency band capability report—as discussed earlier, some embodiments will omit this operation. Next, as shown at block 620, a frequency band capability report is transmitted, over the backhaul link towards the fixed network. This report indicates separate frequency band capabilities for the access link and the backhaul link of the relay node.

In some embodiments, such as in a multi-hop relay, the report further indicates a separate frequency band capability for a relay-to-relay link supported by the relay node. In various embodiments, the report includes one or more band identifiers for each of the access link and the backhaul link, where the one or more band identifiers correspond to frequency bands according to a pre-defined mapping. Likewise, the report may include one or more band identifiers, in some cases, and further include a configuration scenario identifier, where the configuration scenario identifier indicates which of the band identifiers corresponds to each of the backhaul link and the access link according to a predefined rule.

Figure 7:
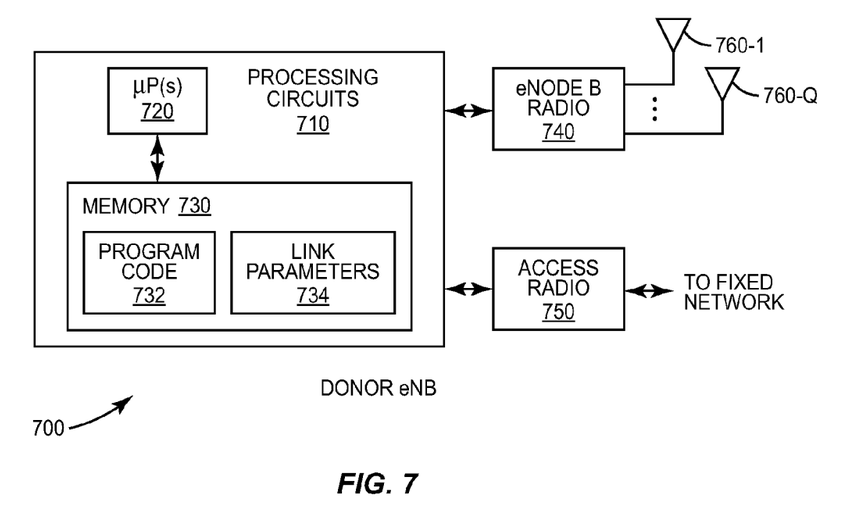
FIG. 7 is a block diagram illustrating components of an example donor base station.
Figure 8:
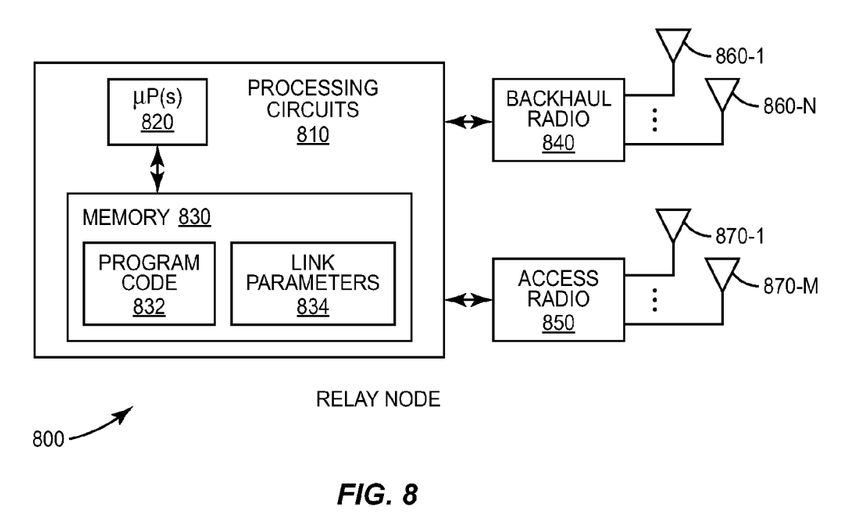
FIG. 8 is a block diagram illustrating components of an example relay node.

FIGS. 7 and 8 illustrate elements of an example relay node and example donor eNodeB, respectively. These and similar devices can be configured to carry out one or more of the corresponding methods described above. Thus, for example, the relay node 800 pictured in FIG. 8 includes processing circuits 810 in addition to backhaul radio 840 and access radio 850. Each of the backhaul radio 840 and access radio 850 may use one or several antennas (e.g., for MIMO operation). In the illustrated embodiment, backhaul radio 840 has N antennas, 860-1 to 860-N, while access radio 850 has M antennas, 870-1 to 870-M. In some cases one or more of these antennas may be shared by transmit and receive functions.

Processing circuits 810 comprise a microprocessor 820 and memory 830. Microprocessor 820 is configured with appropriate program code 832 for carrying out one or several of the reporting and configuration techniques described above. Note that memory 830, which may comprise several types of memory, includes storage for link parameters 834, which includes data indicating the maximum and/or minimum radio powers for the backhaul and access links.

As seen in FIG. 7, donor eNodeB 700 has a similar general configuration to that of relay node 800. However, in addition to processing circuits 710, donor eNodeB comprises an eNodeB radio 740 (for communicating with relay node 800 and with one or more UEs) and a network interface 750, which provides a link to the fixed portion of the telecommunications network, including, in some embodiments, other donor eNodeBs. As was the case with the relay node of FIG. 8, the eNodeB radio 740 may use one or several antennas (e.g., for MIMO operation). The illustrated embodiment has Q antennas, labeled 760-1 to 760-Q. Again, in some cases one or more of these antennas may be shared for transmit and receive operation.

Processing circuits 710 comprise at least one microprocessor 720 and memory 730. Microprocessor 730 is configured with appropriate program code 732 for carrying out one or several of the reporting and configuration techniques described above. Memory 730, which may comprise several types of memory, also includes storage for link parameters 734, which includes data indicating the maximum and/or minimum radio powers for the backhaul and access links of one or more relay NodeBs.

Although the various base stations discussed herein are generally described and illustrated as though each base station is a single physical entity, those skilled in the art will recognize that various physical configurations are possible, including those in which the functional aspects discussed here are split between two physically separated units. Thus, the term "base station" is used herein to refer to a collection of functional elements (one of which is a radio transceiver that communicates wirelessly with one or more mobile stations), which may or may not be implemented as a single physical unit.

The techniques and apparatus described above enable a relay node to report frequency band capability information to a donor node or to other network nodes, for each of the access link and backhaul link supported by the relay node. The reported backhaul and access frequency capability information can be used for various purposes, such as radio resource management, network planning/dimensioning, etc. It should be noted again that the inventive techniques described herein are applicable to any type of RAT (LTE, HSPA, GSM, CDMA2000, HRPD, Wimax etc) or to a relay comprising a mixture of RATs (e.g., multi-standard radio (MSR) relays). Furthermore, the MSR or non-MSR relay may support contiguous carriers or non-contiguous carriers. These techniques are also applicable to relays that support carrier aggregation or multi-carrier operation or multi-carrier-multi-RAT operation. The techniques are still further applicable to wireless relays, e.g., mobile relays, which are typically deployed in a movable vehicle to mainly serve users in the vehicle or a wireless terminal acting as a relay, etc. Furthermore, all different types and categories of relays may operate in single hop relay system or in multi-hop relay system.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive, and all modifications and variations that fall within the scope of the appended claims are intended to be embraced therein.

What is claimed is:

1. A method for managing a wireless communication network that includes a wireless relay node for wirelessly transmitting signals to and wirelessly receiving signals from one or more access terminals, or to and from one or more other relay nodes, or to and from one or more of both, via an access link, and for wirelessly transmitting signals to and wirelessly receiving signals from a donor node, via a backhaul link, the method comprising, in a network node:
    receiving, from the relay node, a report indicating separate frequency band capabilities for the access link and the backhaul link, wherein said frequency band capabilities for the access link or the backhaul link include aggregated component carrier frequencies within each frequency band that are supported by the relay node for the access link or the backhaul link, wherein the component carrier frequencies are aggregated in one of the following deployments: contiguous, non-contiguous, or a hybrid of contiguous and non-contiguous; and
    applying the indicated frequency band capabilities in one or more network management tasks.

2. The method of claim 1, wherein the frequency band capabilities for the access link differ from the frequency band capabilities for the backhaul link.

3. The method of claim 1, further comprising first sending a request to the relay node to report its frequency band capabilities to the network node.

4. The method of claim 1, wherein the one or more network management tasks comprise:
    configuring the relay node to operate the access link and the backhaul link using the selected frequency bands.

5. The method of claim 4, further comprising selecting the frequency bands for the access link and the backhaul link, based on the reported frequency band capabilities.

6. The method of claim 5, wherein selecting the frequency bands is further based on one or more of:
    predicted or actual radio coverage for either or both of the access link and the backhaul link;
    bandwidth requirements for either or both of the access link and the backhaul link;
    a deployment scenario for the relay node; and
    a type characteristic of the relay node.

7. The method of claim 6, wherein the type characteristic of the relay node comprises one or more of:
    fixed or stationary relay;
    mobile or movable relay; and
    wireless or mobile terminal acting as relay.

8. The method of claim 1, wherein the one or more network management tasks comprise one or more of:
    radio resources management tasks;
    network planning;
    network dimensioning; and
    coverage enhancement.

9. The method of claim 1, wherein the report further indicates a separate frequency band capability for a relay-to-relay link supported by the relay node.

10. The method of claim 1, wherein the report comprises one or more band identifiers for each of the access link and the backhaul link, and wherein the one or more band identifiers correspond to frequency bands according to a pre-defined mapping.

11. The method of claim 1, wherein the report comprises one or more band identifiers and wherein the network node determines which of the band identifiers corresponds to each of the backhaul link and the access link, according to a predefined rule.

12. The method of claim 11, wherein the report further comprises a configuration scenario identifier and wherein the network node determines which of the band identifiers corresponds to each of the backhaul link and the access link according to the configuration scenario identifier and the predefined rule.

13. The method of claim 11, wherein the network node determines which of the band identifiers corresponds to each of the backhaul link and the access link according to a predefined rule that varies according to a type of the relay node.

14. The method of claim 1, wherein the relay node is connected to one of the one or more other relay nodes via a second backhaul link, and wherein the report includes frequency band capabilities for the second backhaul link.

15. A method for managing a wireless communication network that includes a wireless relay node for wirelessly transmitting signals to and wirelessly receiving signals from one or more access terminals, or to and from one or more other relay nodes, or to and from one or more of both, via an access link, and for wirelessly transmitting signals to and wirelessly receiving signals from a donor node, via a backhaul link, the method comprising, in the relay node:
    transmitting, over the backhaul link, a report indicating separate frequency band capabilities for the access link and the backhaul link, wherein said frequency band capabilities for the access link or the backhaul link include aggregated component carrier frequencies within each frequency band that are supported by the relay node for the access link or the backhaul link, wherein the component carrier frequencies are aggregated in one of the following deployments: contiguous, non-contiguous, or a hybrid of contiguous and non-contiguous.

16. The method of claim 15, further comprising first receiving a request, from the donor node or from a second relay node, to provide the report.

17. The method of claim 15, wherein the report further indicates a separate frequency band capability for a relay-to-relay link supported by the relay node.

18. The method of claim 15, wherein the report comprises one or more band identifiers for each of the access link and the backhaul link, wherein the one or more band identifiers correspond to frequency bands according to a pre-defined mapping.

19. The method of claim 14, wherein the report comprises one or more band identifiers and further comprises a configuration scenario identifier, wherein the configuration scenario identifier indicates which of the band identifiers corresponds to each of the backhaul link and the access link according to a predefined rule.

20. The method of claim 15, wherein the relay node is connected to one of the one or more other relay nodes via a second backhaul link, and wherein the report includes frequency band capabilities for the second backhaul link.

21. A network node for use in a wireless communication network that includes a wireless relay node for wirelessly transmitting signals to and wirelessly receiving signals from one or more access terminals, or to and from one or more other relay nodes, or to and from one or more of both, via an access link, and for wirelessly transmitting signals to and wirelessly receiving signals from a donor node, via a backhaul link, the network node comprising
    a transceiver configured to communicate with the relay node, and
    a processing circuit configured to:
        receive from the relay node, via the transceiver, a report indicating separate frequency band capabilities for the access link and the backhaul link, wherein said frequency band capabilities for the access link or the backhaul link include aggregated component carrier frequencies within each frequency band that are supported by the relay node for the access link or the backhaul link, wherein the component carrier frequencies are aggregated in one of the following deployments: contiguous, non-contiguous, or a hybrid of contiguous and non-contiguous; and
        apply the indicated frequency band capabilities in one or more network management tasks.

22. The network node of claim 21, wherein the processing circuit is further configured to first send a request to the relay node, via the transceiver, requesting the relay node to report its frequency band capabilities to the network node.

23. The network node of claim 21, wherein the network node is the donor node, and wherein the one or more network management tasks comprise:
    selecting frequency bands for the access link and the backhaul link, based on the reported frequency band capabilities; and
    configuring the relay node to operate the access link and the backhaul link using the selected frequency bands.

24. The network node of claim 21, wherein the one or more network management tasks comprise one or more of:
    radio resources management tasks;
    network planning;
    network dimensioning; and
    coverage enhancement.

25. The network node of claim 21, wherein the report further indicates a separate frequency band capability for a relay-to-relay link supported by the relay node.

26. The network node of claim 21, wherein the report comprises one or more band identifiers for each of the access link and the backhaul link, and wherein the one or more band identifiers correspond to frequency bands according to a pre-defined mapping.

27. The network node of claim 21, wherein the report comprises one or more band identifiers and wherein the processing circuit is configured to determine which of the band identifiers corresponds to each of the backhaul link and the access link, according to a predefined rule.

28. The network node of claim 27, wherein the report further comprises a configuration scenario identifier and wherein the processing circuit is configured to determine which of the band identifiers corresponds to each of the backhaul link and the access link according to the configuration scenario identifier and the predefined rule.

29. The network node of claim 27, wherein the processing circuit is configured to determine which of the band identifiers corresponds to each of the backhaul link and the access link according to a predefined rule that varies according to a type of the relay node.

30. The network node of claim 21, wherein the relay node is connected to one of the one or more other relay nodes via a second backhaul link, and wherein the report includes frequency band capabilities for the second backhaul link.

31. A relay node for use in a wireless communication network, the relay node comprising:
    an access radio configured to wirelessly transmit signals to and wirelessly receive signals from one or more access terminals, or to and from one or more other relay nodes, or to and from one or more of both, via an access link;
    a backhaul radio configured to wirelessly transmit signals to and wirelessly receive signals from a donor node, via a backhaul link; and
    a processing circuit configured to transmit, over the backhaul link, a report indicating separate frequency band capabilities for the access link and the backhaul link, wherein said frequency band capabilities for the access link or the backhaul link include aggregated component carrier frequencies within each frequency band that are supported by the relay node for the access link or the backhaul link, wherein the component carrier frequencies are aggregated in one of the following deployments: contiguous, non-contiguous, or a hybrid of contiguous and non-contiguous.

32. The relay node of claim 31, wherein the processing circuit is further configured to first receive a request, from the donor node or from a second relay node, to provide the report.

33. The relay node of claim 31, wherein the report further indicates a separate frequency band capability for a relay-to-relay link supported by the relay node.

34. The relay node of claim 31, wherein the report comprises one or more band identifiers for each of the access link and the backhaul link, wherein the one or more band identifiers correspond to frequency bands according to a pre-defined mapping.

35. The relay node of claim 31, wherein the report comprises one or more band identifiers and further comprises a configuration scenario identifier, wherein the configuration scenario identifier indicates which of the band identifiers corresponds to each of the backhaul link and the access link according to a predefined rule.

36. The relay node of claim 31, wherein the processing circuits are further configured to operate the relay node as a user terminal.

37. The relay node of claim 31, wherein the relay node is connected to one of the one or more other relay nodes via a second backhaul link, and wherein the report includes frequency band capabilities for the second backhaul link.

* * * * *